United States Patent Office 3,844,993
Patented Oct. 29, 1974

3,844,993
AIR-DRYING COATING COMPOSITION OF AN ACRYLIC ENAMEL AND AN ISOCYANATE CROSS-LINKING AGENT
Lester Isaac Miller, Flint, Mich., assignor to E. I. du Pont de Nemours and Company, Wilmington, Del.
No Drawing. Continuation-in-part of abandoned application Ser. No. 157,663, June 28, 1971. This application June 30, 1972, Ser. No. 268,043
Int. Cl. C08f 27/10, 21/04; C09d 3/72
U.S. Cl. 260—22 TN     14 Claims

ABSTRACT OF THE DISCLOSURE

The coating composition of this invention contains as the film-forming binder an acrylic vinyl oxazoline ester polymer and an alkyd resin blended with a polyisocyanate and preferably, with a catalyst of an alkyl acid phosphate; this composition cures rapidly at ambient temperature to a tough, durable, scratch resistant, gasoline resistant and alkali resistant finish useful for appliances and motor vehicles and is particularly useful as an automotive or truck repair finish.

CROSS-REFERENCE TO RELATED APPLICATIONS

This application is a continuation-in-part of my now abandoned application Ser. 157,663, filed June 28, 1971.

BACKGROUND OF THE INVENTION

This invention relates to an enamel coating composition and in particular to an enamel coating composition of an acrylic polymer and a polyisocyanate that cures rapidly at ambient temperatures to a hard, glossy and durable finish.

Acrylic enamels are widely used for painting or refinishing automobiles and trucks and are used as industrial maintenance finishes. One particularly high quality acrylic enamel of this type is described in Miller and Walus U.S. Pat. 3,585,160, issued June 15, 1971. This enamel has an excellent adherence to primed, uncoated, enamel coated or lacquer coated metal substrates and dries to a high gloss, smooth, durable finish. However, this enamel does not cure rapidly at ambient temperatures to a hard, tough, durable finish but may take up to a week of cure to reach maximum properties. Polyisocyanates have been used as cross-linking agents in coating compositions as is shown in Sekmakas U.S. Pat. 3,457,324, issued July 22, 1969 and Bearden U.S. Pat. 3,404,107, issued Oct. 1, 1968. But none of these compositions provide a rapid cure finish that has the excellent physical properties currently required by industry.

The novel composition of this invention utilizes an acrylic vinyl oxazoline ester resin in combination with a specific polyisocyanate to provide a high quality finish which cures rapidly at application temperatures.

SUMMARY OF THE INVENTION

In the coating composition of this invention which comprises 5–60% by weight of a polymer blend and 95–40% by weight of a solvent for the polymer blend in which the blend consists essentially of (1) 40–95% by weight of an acrylic vinyl oxazoline ester polymer that has a relative viscosity of about 1.03–1.30 measured according to ASTM-D-445-46-T, Method B at 25° C. and which consists essentially of a backbone of 50–96.5% by weight, based on the weight of the polymer, of polymerized ethylenically unsaturated monomers selected from the group consisting of an alkyl methacrylate having 1-8 carbon atoms in the alkyl group, cyclohexyl methacrylate, acrylonitrile, styrene and mixtures of these monomers and the backbone can contain up to 20% by weight, based on the weight of the polymer, of hydroxy alkyl acrylate or hydroxy alkyl methacrylate monomers having 2-4 carbon atoms in the alkyl groups and contains in the backbone 3–35% by weight, based on the weight of the polymer, of polymerized vinyl oxazoline esters of the formula

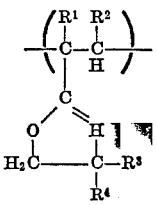

and has attached to the polymer backbone 0.5–15% by weight, based on the weight of the polymer, of pendent amino ester groups of the formula

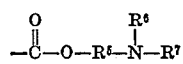

wherein $R^1$ is a hydrocarbon group having 2–20 carbon atoms;
$R^2$ is selected from the group consisting of hydrogen and an alkyl group having 1-4 carbon atoms;
$R^3$ and $R^4$ are

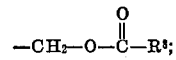

$R^5$ is an aliphatic hydrocarbon group having 1-6 carbon atoms;
$R^6$ and $R^7$ are individually selected from the group consisting of hydrogen, a saturated aliphatic hydrocarbon group having 1-6 carbon atoms; and
$R^8$ is from drying oil fatty acids, and correspondingly, (2) 5–60% by weight of an alkyd resin or a blend of alkyd resins;

wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid;

the improvement used with the above composition comprises the addition of 0.5–200% by weight, based on the weight of the coating composition, of a polyisocyanate solution that consists essentially of 2–75% by weight of a polyisocyanate which is either an aliphatic polyisocyanate or a cycloaliphatic diisocyanate and a solvent for the polyisocyanate that is compatible with the coating composition.

DESCRIPTION OF THE INVENTION

The coating composition of this invention contains about 5–60% by weight of a film-forming polymer blend of about 40–95% by weight of a vinyl oxazoline polymer and 5–60% by weight of an alkyl resin, or an acrylic resin. Preferably, the coating composition contains a polymer blend of 50–75% by weight of the vinyl oxazoline polymer, and correspondingly, 50–25% by weight of an alkyd resin or an acrylic resin.

The vinyl oxazoline polymer provides the coating composition with rapid air drying characteristics and excellent adhesion to substrates, such as primed or unprimed steel, alkyd enamels, alkyd melamine enamels, acrylic lacquers and the like. The polymer preferably has a relative viscosity of about 1.03–1.30 and preferably, a viscosity of about 1.05–1.20. The "relative viscosity"

is the value obtained by dividing the efflux time of a solution of the polymer by the efflux time of a solvent used to form the solution. The efflux times are measured according to the procedure of ASTM-D-445-46-T, Method B. The polymer solution comprises 0.25 gram of the polymer dissolved in 50 cubic centimeters of solvent. Ethylene dichloride is the solvent. The efflux times are measured at 25° C. in a standard apparatus, sold under the designation of a modified Ostwald viscometer.

The backbone of the vinyl oxazoline polymer can be of any type of copolymerizable ethylenically unsaturated monomers. Typical monomers that can be used are, for example, aromatic hydrocarbons having vinylidene groups such as styrene, alkyl substituted styrene, such as α-methyl styrene; acrylonitrile; esters of acrylic acid and methacrylic acid, such as methyl methacrylate, ethyl methacrylate, propyl methacrylate, butyl methacrylate, hexyl methacrylate, cyclohexyl methacrylate, 2-ethylhexyl methacrylate, and the like. One preferred group of monomers are alkyl methacrylate 1-8 carbon atoms in the alkyl group since these polymers form a high quality product. A small amount of ethylenically unsaturated carboxylic acids can also be used in the backbone, such as acrylic acid, methacrylic acid, crotonic acid, itaconic acid, maleic acid and the like.

Up to 20% by weight, based on the weight of the polymer, of hydroxy alkyl methacrylate or hydroxy alkyl acrylate monomers can be polymerized into the backbone of the backbone of the polymer. Preferably, about 5–10% by weight of the hydroxy containing monomers are used. Typical hydroxy alkyl acrylates or methacrylates have 2 to 4 carbon atoms in the alkyl groups and are, for example, hydroxy ethyl acrylate, hydroxy propyl acrylate, hydroxy butyl acrylate, hydroxy ethyl methacrylate, hydroxy propyl methacrylate, hydroxy butyl methacrylate and the like. Preferred is hydroxy ethyl acrylate.

Particularly useful monomer combinations which form the backbone of the vinyl oxazoline polymer used in this invention and which give a high quality polymer are, for example, styrene, methyl methacrylate, 2-ethylhexyl methacrylate, cyclohexyl methacrylate, butyl methacrylate and mixtures thereof.

The amino ester groups of the vinyl oxazoline polymer used in this invention comprise about 0.5–15% by weight of the polymer and are provided by alkyl amino acrylates or methacrylates of the formula:

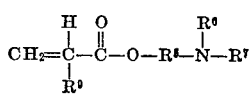

in which $R^5$ is an aliphatic hydrocarbon group having 1–6 carbon atoms,
$R^6$ and $R^7$ are either hydrogen, or an aliphatic saturated hydrocarbon group having 1–6 carbon atoms, and
$R^9$ is either hydrogen or methyl.

Typical alkyl amino acrylates or methacrylates that are used to form the polymer used in this invention are: dimethylaminoethyl methacrylate, diethylaminoethyl methacrylate, dipropylaminoethyl methacrylate, methylethylaminoethyl methacrylate, butylaminoethyl methacrylate, tertiarybutylaminoethyl methacrylate, diethylaminopropyl methacrylate, diethylaminobutyl methacrylate, diethylaminopentyl methacrylate, diethylaminohexyl methacrylate and the like. Preferred are diethylaminoethyl methacrylate and tertiarybutylamino ethyl methacrylate, since these compounds form a high quality product and are readily available.

The oxazoline ester of the polymer used in this invention comprises about 3–35% by weight of the polymer and is provided by the following monomer which is polymerized into the polymer backbone which is of the following formula

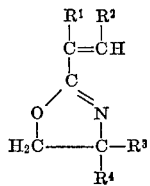

wherein $R^1$ is a hydrocarbon group having 2–20 carbon atoms,
$R^2$ is either hydrogen or an alkyl group having 1–4 carbon atoms,
$R^3$ and $R^4$ are either hydrogen or an alkyl group having 1–4 carbon atoms or

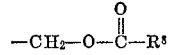

$R^8$ is a hydrocarbon group having 3–21 carbon atoms.

Preferably, $R^1$ and $R^8$ are unsaturated aliphatic hydrocarbon groups which are from drying oil fatty acids and $R^2$ is hydrogen. Preferred drying oil fatty acids that are used to prepare the above oxazoline esters are linseed oil fatty acids, tall oil fatty acids and dehydrated caster oil fatty acids.

These oxazoline esters man be made according to Purcell, U.S. Pat. 3,248,397, issued Apr. 26, 1966. One preferred compound of this type is a reaction product of 1 mol of tris-(hydroxymethyl)-amino methane and 3 mols of tall oil fatty acids which is subsequently reacted with formaldehyde. This compound is currently sold under the trademark of "Chemacoil TA 100." Another preferred compound is made as above except linseed oil fatty acids are substituted for the tall oil fatty acids.

The process for making the polymer used in this invention comprises blending in a typically useful solvent about 3–35% of the aforementioned vinyl oxazoline ester, 0.5–15% of an alkyl amino acrylate or methacrylate and about 50–96.5% by weight of copolymerizable ethylenically unsaturated monomers. This mixture is then reacted at about 50–200° C. for about 1–6 hours to form a polymer which has a relative viscosity in the aforementioned range of 1.03–1.30.

The following are typically useful solvents that can be used in the process or can be subsequently used to dilute the polymer composition to form a paint composition: acetone, 2-nitro propane, methyl ethyl ketone, amyl alcohol, ethylene glycol monoethyl ether acetate, ethyl acetate, ethyl alcohol, isopropanol, ethylene dichloride, diacetone alcohol, diisobutyl ketone, cyclohexanone, amyl acetate, ethylene glycol monobutyl ether, furfural, petroleum naphtha, toluene, xylene, substituted benzene, benzene, substituted toluene, hexane, aromatic hydrocarbons, high boiling petroleum naphthas, high solvency petroleum hydrocarbons, diethyl ether, methyl amyl acetate, butanol and the like.

Preferred polymerization catalysts that are used to prepare the vinyl oxazoline polymers used in this invention are azo type catalysts, such as azobisisobutyronitrile and the like. The amount of catalyst used preferably is about 0.01–2% by weight based on the weight of the monomers.

The alkyd resin used to prepare a coating composition of this invention has an acid number of about 2–25, and preferably, about 5–14, and is about 5–7 acid number units from the gel point of the alkyd resin.

These alkyd resins are of the typical type which are the esterification product of a drying oil fatty acid, a polyhydric alcohol, a dicarboxylic and an aromatic monocarboxylic acid.

Typical drying oil fatty acids are chinawood oil, linseed oil, soya oil, tall oil and dehydrated castor oil fatty acids.

Typical polyhydric alcohols that can be used to prepare the alkyd resin used in this invention are glycerine, pentaerythritol, trimethylol ethane, trimethylol propane, glycols, such as ethylene glycol, propylene glyco, butane diol, pentane diol and the like.

Typical dicarboxylic acids or anhydrides that can be used to prepare the alkyd resin are phthalic acid phthalic anhydride, isophthalic acid, terephthalic acid, maleic fumaric and the like. Typical monocarboxylic aromatic acds are benzoic acids, paratertiary butylbenzoic acid, phenol acetic acid, triethyl benzoic acid and the like.

One preferred alkyd resin is a reaction product of an acrylic polymer and an alkyd resin. The alkyd resin portion of the polymer can be of any of those described above while the acrylic portion of the polymer is an ester of acrylic acid or methacrylic acid, acrylonitrile and can contain styrene and also contains a small amount, i.e., 0.5–5%, of an ethylenically unsaturated monocarbcarboxylic or dicarboxylic acid, such as methacrylic acid, acrylic acid, itaconic acid, and the like. The acrylc ester portion of the polymer is prepared initially and blended and is then reacted with the alkyd resin in the early stage of the alkyd resin preparation. The polymer is then formed by using conventional polymerization techniques. One preferred polymer of this type is a styrene, methyl methacrylate, methacrylic acid and the alkyd portion is of a linseed oil fatty acid, benzoic acid, pentaerythritol and phthalic anhydride.

An acrylic resin can be used in place of the alkyd resin to form the novel coating composition of this invention. The acrylic resin preferably has a relative viscosity, measured as described above, of about 1.02–1.06. The acrylic resin can be of esters of acrylic or methacrylic acid, acrylonitrile, an aromatic hydrocarbon having α-β vinyl unsaturation, such as styrene or mixtures thereof. The acrylic resin can also contain hydroxyalkyl methacrylate or acrylate, such as hydroxyethyl acrylate or hydroxypropyl methacrylate. Also, small amounts of an α-β unsaturated carboxylic acid, such as acrylic acid or methacrylic acid, can be used in the acrylic resin. One preferred acrylic resin is of styrene, butyl acrylate, hydroxyethyl acrylate and acrylic acid.

Preferably, the novel coating composition of this invention is pigmented and contains pigment in a pigment to binder ratio of about 1:100 to about 75:100. The term "binder" refers to the film-forming constituents in the novel coating composition. Examples of the great variety of pigments which are used in the novel coating composition of this invention are metallic oxides, preferably titanium dioxide, zinc oxide, iron oxide and the like, metal hydroxides, metal flakes, such as lead chromate, sulfides, sulfates, carbonates, carbon black, silica, talc, china clay, lead blues, iron blues, organic reds, organic maroons, and other organic dyes and lakes.

The pigments can be introduced into the coating composition by first forming a mill base with the alkyd resin or the vinyl oxazoline polymer of this invention by conventional sand grinding or ball mill techniques, and then blending the mill base with the film-forming polymers as shown in the following Examples.

Plasticizers in amounts up to 10% by weight, based on the weight of binder can be used in the novel composition of this invention. Plasticizers that can be used are benzylbutyl phthalate, dibutyl phthalate, triphenyl phosphate, 2-ethylhexylbenzyl phthalate, dicycolhexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl-hexyl ester of hexamethylene diphthalate, di(methyleyclohexyl)phthalate. One preferred plasticizer of this group is benzyl butyl phthalate since it forms a coating with excellent balance of properties.

Small amounts of conventional metallic driers are used in the novel coating composition, such as lead naphthenate, manganese naphthenate, cobalt naphthenate, lead tallate, nickel salts, such as nickel octoate and the like.

The polyisocyanate solution used in this invention is preferably added to the coating composition and blended therewith only a short time before the composition is used. About 0.5–200% by weight, based on the weight of the coating composition, of the polyisocyanate solution is used. Preferably, about 50–150% by weight of the polyisocyanate solution is used.

For best results, it is preferable to add the coating composition to the polyisocyanate solution. The polyisocyanate solution consists essentially of 2–75% by weight of a polyisocyanate dissolved in a solvent or a blend of solvents for the polyisocyanate that are compatible with the coating composition. Any of the aforementioned solvents can be used.

Typical aliphatic polyisocyanates and cycloaliphatic diisocyanates that are used to form the polyisocyanate solution used in this invention are:

ethylene diisocyanate,
propylene-1,2-diisocyanate,
tetramethylene diisocyanate,
hexamethylene diisocyanate,
decamethylene diisocyanate,
cyclohexylene-1,2-diisocyanate,
methylene-bis-(4-cyclohexylisocyanate),
ethylene-bis-(4-cyclohexylisocyanate),
propylene-bis-(4-cyclohexylisocyanate),
and the like.

The preferred polyisocyanate used in this invention has the formula:

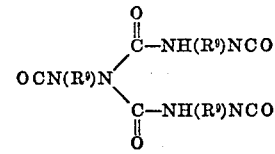

wherein $R^9$ is an alkyl group having 1–12 carbon atoms. One preferred polyisocyanate is the biuret of hexamethylene diisocyanate that has the above structural formula in which $R^9$ is a saturated straight chain hydrocarbon group having 6 carbon atoms. These biurets are prepared according to the process described in Mayer et al. U.S. Pat. 3,245,941, issued Apr. 12, 1966.

The polyisocyanate can be blended or reacted with a monohydric alcohol to provide a coating composition that has excellent hardness, gloss and image definition and in general a good appearance. The polyisocyanate can be cold blended with the monohydric alcohol and a solvent and then the mixture is added to the coating composition or the polyisocyanate can be reacted with the monohydric alcohol preferably at 80–100° C. for about 15–60 minutes and then added to the alkyd resin to form the novel coating composition of this invention.

The polyisocyanate should have a sufficient number of isocyanate groups available for cross-linking with the alkyd resin. Preferably, one equivalent of the monohydric alcohol is used with 12 equivalents of the polyisocyanate. In another useful composition one equivalent of the monohydric alcohol is used with 3 equivalents of the polyisocyanate.

Typical monohydric alcohols containing 4–20 carbon atoms can be used such as butanol, isobutanoyl, hexanol, octanol, 2-ethyl hexanol, nonyl alcohol, lauryl alcohol, dodecanol and the like. Preferred are 8–12 carbon atom monohydric alcohols.

A catalyst of an alkyl tin dilaurate such as dibutyl tin dilaurate can be added to the above polyisocyanate solution.

The polyisocyanate solution can contain about 0.1–5% by weight, based on the weight of the solution, of the alkyl acid phosphate in which the alkyl group has 1–12 carbon atoms, preferably the alkyl group has 2–6 carbon atoms. These alkyl acid phosphate solutions have an acid number of about 4–250. The alkyl acid phosphate catalysts that are used are the mono or dialkyl acid phosphates or mixtures thereof; typical catalysts are, for example:

methyl acid phosphate,
ethyl acid phosphate,
propyl acid phosphate,
butyl acid phosphate,
pentyl acid phosphate,
hexyl acid phosphate,
octyl acid phosphate,
nonyl acid phosphate,
decyl acid phosphate,
lauryl acid phosphate.

A mixture of mono and dibutyl acid phosphate having an acid number of 118–143 is preferred to form a high quality finish.

One particularly useful polyisocyanate solution used in this invention contains

5–50% by weight of the preferred polyisocyanate or methylene-bis-(4-cyclohexyl isocyanate), 0.1–5% by weight of an alkyl acid phosphate catalyst, and 49.9–89.9% by weight of a hydrocarbon solvent.

Another particularly preferred polyisocyanate solution contains

10–25% by weight of the preferred polyisocyanate or methylene - bis - (4 - cyclohexyl isocyanate), 1–3% by weight of butyl acid phosphate, and 74–89% by weight of a hydrocarbon solvent; optionally this solution can contain 1–3% by weight of an alkyl tin dilaurate catalyst.

Up to 10% by weight, based on the weight of the polymer blend, of cellulose acetate butyrate can be used in the coating composition. The cellulose actate butyrate preferably has a butyryl content of about 45–55% by weight and a viscosity of 0.1–6 seconds determined at 25° C. according to ASTM–D–1343–56.

The improved coating compositions of this invention can be applied to a vairety of substrates, for example, metal, wood, glass, plastics and the like, by any of the usual application methods, such as spraying, electrostatic spraying, dipping, brushing, flow coating and the like. The viscosity of the composition can be adjusted for any of these methods by varying the solvents. These coatings can be air dried or baked at a relatively low temperature of about 65–140° C. for about 15 minutes–2 hours. The resulting coating is about 0.1–5 mils thick, preferably 2–4 mils thick, and has good gloss and can be rubbed or polished in accordance with conventional techniques, if desired, to improve smoothness or apparent gloss or both. The novel coating composition of the invention does not yellow noticeably on baking and gives a hard, durable, scratch resistant, gasoline resistant, weather resistant, alkali resistant, glossy coating which is suitable for auto bodies, truck bodies, repair of auto bodies and truck bodies, airplanes, railroad equipment, appliances, vending machines, outdoor equipment, bridges, water tanks, gas tanks, gasoline tanks, and the like.

Another unique characteristic of the novel coating composition of this invention is that the coating, after application and a short air dry or bake period, can be recoated or a second color can be applied for two-toning without lifting. This characteristic makes it easy to repair and recoat with a second coat.

The rapid air dry to a glossy finish, the excellent adhesion to substrates are the characteristics of the coating composition of this invention that make it particularly useful for repair and refinish of autos and trucks. Also, the novel coating composition is suitable for repairing all types of coated metal substrates, such as metals coated with acrylic lacquers, nitrocellulose lacquers, alkyd-melamine paints and the like.

The novel composition of this invention provides a flexible, tough finish for a plasticized polyvinyl chloride substrate. The finish is resistant to plasticizer migration from the substrate and also has excellent adhesion to the polyvinyl chloride substrate.

The following examples illustrate the invention. All quantities shown are on a weight basis unless otherwise indicated.

EXAMPLE 1

Preparation of acrylic-vinyl oxazoline ester polymer

| | Parts by weight |
|---|---|
| Portion 1: | |
| Toluene | 176.0 |
| Acetone | 84.8 |
| Portion 2: | |
| Methyl methacrylate | 169.5 |
| Butyl methacrylate | 213.2 |
| Tertiary butylaminoethyl methacrylate | 29.1 |
| Vinyl oxazoline ester of linseed oil fatty acids (reaction product of 1 mole of tris-(hydroxymethyl)-aminomethane with 3 moles of linseed oil fatty acids which is subsequently reacted with 1 mole of formaldehyde using the process of U.S. Pat. 3,248,397, issued Apr. 26, 1966) | 72.6 |
| Azobisisobutyronitrile | 3.6 |
| Portion 3: | |
| Azobisisobutyronitrile | 1.2 |
| Portion 4: | |
| Azobisisobutyronitrile | 1.2 |
| Portion 5: | |
| Azobisisobutyronitrile | 1.2 |
| Portion 6: | |
| Toluene | 62.0 |
| Total | 814.4 |

Portion 1 is charged into a reaction vessel equipped with a stirrer and reflux condenser and the ingredients are heated to about 70–75° C. Portion 2 is premixed and slowly added at an even and continuous rate to the reaction vessel over a 2-hour period, while maintaining the reaction mixture at its reflux temperature which varies about 70–82° C. The reaction mixture is maintained at its reflux temperature for about 1 hour, and then Portion 3 is added and the reaction is refluxed an additional hour.

Portion 4 is then added and the mixture is again refluxed for an additional hour. Portion 5 is then added and the mixture is refluxed for an additional 2 hours, or until the total polymer solids of the solution reaches at least 63%. The heat is then removed from the reaction vessel and Portion 6 is added.

The resulting polymer solution has a Gardner Holdt viscosity of X–Z measured at 25° C. and a solids content of about 58%.

The polymer is the reaction product of

| | Percent by weight |
|---|---|
| Methyl methacrylate | 35 |
| Butyl methacrylate | 44 |
| Tertiary butylaminoethyl methacrylate | 6 |
| Vinyl oxazoline ester of linseed oil fatty acid | 15 |
| Total | 100 |

An alkyd resin is prepared as follows:

| | Parts by weight |
|---|---|
| Portion 1: | |
| Linseed oil fatty acids | 178.6 |
| Benzoic acid | 59.8 |
| Pentaerythritol | 123.8 |
| Phthalic anhydride | 63.3 |
| Dibutyl tin oxide | 0.6 |
| Xylene | 21.3 |
| Portion 2: | |
| Phthalic anhydride | 68.7 |
| Xylene | 2.8 |
| Portion 3: | |
| Xylene | 350.5 |
| Total | 869.4 |

The ingredients of Portion 1 are premixed and charged into a reaction vessel equipped with a reflux condenser and heated to the reflux temperature which is about 166° C. The reaction mixture is maintained at its reflux temperature which may rise to about 218° C. The samples of the reaction mixture are taken periodically to determine the acid number by conventional techniques. When an acid number of about 5–10 is reached, Portion 2 is then added and the reaction mixture is brought back to its reflux temperature which is about 205° C., and the reaction is continued until the polymer attains an acid number of about 10–12. When the aforementioned acid number is reached, Portion 3 is charged into the reaction vessel.

The resulting alkyd resin solution has a polymer solids of about 55% by weight and the polymer has a Gardner Holdt viscosity of about V–Z measured at 25° C.

The alkyd resin is the esterification product of

| | Percent by weight |
|---|---|
| Linseed oil fatty acids/pentaerythritol | 41.6 |
| Pentaerythritol benzoate | 15.0 |
| Pentaerythritol phthalate | 39.4 |
| Pentaerythritol | 4.0 |
| Total | 100.0 |

A pigment dispersion is prepared as follows:

| | Parts by weight |
|---|---|
| Titanium dioxide pigment (sulfate process) | 630.0 |
| Soya Glycerol phthalate alky resin solution (55% resin solids in which the alkyd is of 43% soya oil, 52% glycerol phthalate, 5% glycerin) | 158.0 |
| Xylene | 212.0 |
| Total | 1000.0 |

The ingredients are premixed and charged into a conventional sand-grinding mill and ground to about a 0.3 mil fineness.

A paint composition is formed by mixing the following ingredients:

| | Parts by weight |
|---|---|
| Portion 1: | |
| Pigment Dispersion (63% titanium dioxide dispersed in the soya oil alkyd resin and hydrocarbon solvent) | 188.02 |
| Soya glycerol phthalate alkyd resin solution (55% resin solids, alkyd described in pigment dispersion) | 26.10 |
| Alkyd resin solution prepared above (55% resin solids) | 136.90 |
| Acrylic-vinyl oxazoline polymer solution prepared above (58% polymer solids) | 302.59 |
| Cobalt naphthenate drier solution (6% cobalt in a hydrocarbon solvent) | 2.68 |
| Manganese naphthenate drier solution (6% manganese in a hydrocarbon solvent) | 0.28 |
| Lead tallate drier solution (24% lead in a hydrocarbon solvent) | 2.68 |
| Hydrocarbon solvent (boiling point 189–219° C., aniline point 28° C.) | 34.43 |
| Naphtha solvent (boiling point 100–163° C.) | 79.56 |
| Portion 2: | |
| Hydrocarbon solvent (boiling point 150–190° C., aniline point —28° C.) | 79.12 |
| Total | 852.36 |

Portion 1 is mixed for about 1 hour and then Portion 2 is added.

The paint composition is then blended with a polyisocyanate solution as follows:

| | Parts by weight |
|---|---|
| Portion 1: | |
| "Desmodur N" solution (75% solids solution of the biuret of hexamethylene diisocyanate in a 50:50 xylene/ethylene glycol monoethyl ether acetate) | 25.0 |
| Toluene | 70.0 |
| Portion 2: | |
| Paint composition (prepared above) | 100.0 |
| Total | 195.0 |

Portion 1 is thoroughly mixed and then Portion 2 is slowly added to Portion 1 and blended with Portion 1.

The above coating composition is reduced to a spray viscosity using an aromatic hydrocarbon solvent. A coating of about 2 mils thick of the paint composition is sprayed onto each of the following sets of panels: autobody steel panels which are primed with pigmented alkyd primer; steel panels coated with an acrylic lacquer; steel panels coated with a pigmented epoxy primer; steel panels coated with a thermosetting acrylic enamel; steel panels coated with an alkyd enamel; steel panels coated with an alkyd melamine enamel. Several of the thermosetting acrylic enamel panels and the alkyd enamel panels and the alkyd melamine panels are sanded and the other panels are unsanded before the paint composition is applied. The coating is allowed to air dry for about 30 minutes and in each case, a tough, durable film having excellent gloss, adhesion and appearance is formed.

Several panels of each of the above sets are air dried for one week and are subjected to a high humidity-low temperature crack which consists of 4 cycles. In each cycle, the panels are subject to (1) 100% relative humidity and 100° F. for 24 hours, (2) —10° F. for 24 hours and (3) room temperature for 4 hours. At the completion of each cycle, the panels are examined with a magnifying glass for cracks. At the end of the test, the coatings of the above panels showed no cracking or dulling and no loss in adhesion to the substrate.

Several panels of each of the above sets are exposed in Florida at a 45° angle facing south. The panels are examined after 4 and 8 months. After 8 months of weathering, each of the panels showed good color retention, excellent gloss, very little chalking and water spotting, and no loss of adhesion to the substrate.

The above tests indicate that the novel paint composition of this invention is an excellent coating for metals and adheres to most types of substrates even under severe conditions.

EXAMPLE 2

A coating composition is prepared by blending the following ingredients:

| | Parts by weight |
|---|---|
| Portion 1: | |
| "Desmodur N" solution (described in Example 1) | 25.0 |
| Toluene | 70.0 |
| Portion 2: | |
| Paint composition (described in Example 1) | 100.0 |
| Portion 3: | |
| Butyl acid phosphate catalyst solution (29.7% solids in xylene having an acid number of 118–143) | 2.0 |
| Total | 197.0 |

Portion 1 is premixed and Portion 2 is added to Portion 1 and mixed, and then Portion 3 is added and is blended to form a coating composition. The resulting coating composition is reduced to a spray viscosity with an aromatic hydrocarbon solvent and sprayed onto sets of steel panels coated as in Example 1 and allowed to air dry for about 30 minutes. The resulting films in each case had excellent adhesion to the various substrates, had high gloss, excellent appearance, excellent durability, excellent crack resistance to high humidity temperature cycles when subjected to the tests as in Example 1 and excellent recoatability.

Six separate coating compositions are prepared as above except the amount of catalyst solution in each composition is held at the following respective levels: 0%, 0.5%, 1.0%, 2.0%, 3.0%, 4.0% (percent by weight based on the weight of the paint). The "pot life" of each of the coating compositions is then determined by holding the composition at 25° C. until the composition gels. The results are as follows:

| Percent catalyst solution | 0 | 0.5 | 1.0 | 2.0 | 3.0 | 4.0 |
|---|---|---|---|---|---|---|
| Pot life (hours) | 3.0 | 3.0 | 3.5 | 5.0 | 7.0 | 7.0 |

The above data shows that the catalyst solution increases the "pot life" of the coating composition.

EXAMPLE 3

A coating composition is prepared by blending the following ingredients:

| | Parts by weight |
|---|---|
| Portion 1: | |
| Catalyst solution (described in Example 2) | 4.0 |
| Toluene | 70.0 |
| "Desmodur N" solution (described in Example 1) | 21.0 |
| Cellulose acetate butyrate solution (30% cellulose acetate butyrate having a viscosity of 0.2 seconds measured according to ASTM–D–1343–56 in a solvent blend of toluene/acetone/butyl acetate in a weight ratio of 4/1/1) | 10.0 |
| Portion 2: | |
| Paint composition (described in Example 1) | 100.0 |
| Total | 205.0 |

Portion 1 is premixed and Portion 2 is slowly added with mixing to Portion 1 to form a coating composition.

The resulting coating composition is reduced to a spray viscosity with an aromatic hydrocarbon solvent and sprayed onto sets of steel panels coated as in Example 1 and allowed to air dry for about 30 minutes. The resulting films in each case had excellent adhesion to the various substrates, had an excellent appearance, good gloss and excellent durability.

EXAMPLE 4

A coating composition is prepared by blending the following ingredients:

| | Parts by weight |
|---|---|
| Ethyl acetate | 170 |
| Toluene | 290 |
| Butyl acetate | 280 |
| Ethylene glycol monoethylether acetate | 140 |
| "Desmodur N" solution (described in Example 1) | 120 |
| Total | 1000 |

The above ingredients are thoroughly blended together. To about 125 parts by volume of the above solution about 100 parts by volume of the paint composition described in Example 1 are slowly added with constant agitation. The resulting composition is reduced to a spray viscosity with an aromatic hydrocarbon solvent and sprayed onto an automobile having a standard acrylic lacquer finish and allowed to air dry for 30 minutes. The resulting finish has an excellent appearance, good gasoline resistance and excellent resistance to marking by a tape.

The composition was also sprayed onto a plasticized polyvinyl chloride molding on the automobile and air dried as above. The finish had an excellent appearance, excellent adherence to the substrate and is resistant to the migration of plasticizer from the substrate.

EXAMPLE 5

An acrylic-vinyl oxazoline ester is prepared as follows:

| | Parts by weight |
|---|---|
| Portion 1: | |
| Toluene | 240.3 |
| Methyl ethyl ketone | 62.0 |
| Methyl methacrylate monomer | 98.5 |
| Butyl methacrylate monomer | 81.3 |
| 2-Hydroxyethyl acrylate monomer | 17.2 |
| 2-Diethylaminoethyl Methacrylate monomer | 12.3 |
| Vinyl oxazoline ester of linseed oil fatty acids (described in Example 1) | 36.9 |
| Portion 2: | |
| Methyl methacrylate monomer | 98.5 |
| Butyl methacrylate monomer | 81.3 |
| 2-Hydroxyethyl acrylate monomer | 17.2 |
| 2-Diethylaminoethyl methacrylate monomer | 12.3 |
| Vinyl oxazoline ester of linseed oil fatty acid (described above) | 36.9 |
| Azobisisobutyronitrile | 7.4 |
| Portion 3: | |
| Azobisisobutyronitrile | 5.4 |
| Methyl ethyl ketone | 24.6 |
| Total | 832.1 |

Portion 1 is charged into a reaction vessel equipped with a stirrer and a reflux condenser and the ingredients are heated to the reflux temperature which is about 100–110° C. Portion 2 is premixed and added to the reaction mixture as follows: 20% of portion 2 is slowly and continuously added over a 30-minute period and then 80% of portion 2 is added slowly and continuously over a 50-minute period; during each addition, the reaction mixture is maintained at the reflux temperature. After portion 2 is added, portion 3 is slowly and continuously added to the reaction mixture over a 30-minute period while holding the reaction mixture at its reflux temperature. The reaction mixture is then held at about 50° C. for an additional 30 minutes and then filtered.

The resulting polymer solution has a 60% polymer solids content and a Gardner Holdt viscosity of W–Y measured at 25° C.

The polymer is the reaction product of

| | Parts by weight |
|---|---|
| Methyl methacrylate | 40 |
| Butyl methacrylate | 33 |
| 2-Hydroxyethyl acrylate | 7 |
| 2-Diethyl aminoethyl methacrylate | 5 |
| Vinyl oxazoline ester of lineseed oil fatty acids | 15 |
| Total | 100 |

An alkyd resin is prepared as follows:

| Portion 1: | Parts by weight |
|---|---|
| Tung oil | 52.50 |
| Dehydrated castor oil fatty acids | 442.00 |
| Benzoic acid | 99.25 |
| Pentaerythritol | 316.50 |
| Phthalic anhydride | 299.50 |
| Dibutyl tin oxide | 0.93 |
| Xylene | 60.75 |
| Portion 2: | |
| Xylene | 228.75 |
| Portion 3: | |
| Phthalic anhydride | 16.50 |
| Portion 4: | |
| Xylene | 646.25 |
| Total | 2162.93 |

Portion 1 is charged into a reaction vessel equipped with a stirrer and a reflux condenser and the ingredients are heated to the reflux temperature which is about 180° C. at the start of the reaction and which rises to about 240° C. at the end of the reaction. The reaction is continued until an acid No. of 5–7 is reached. The reaction mixture is then cooled to 160° C. and portion 2 is added. Portion 3 is added next and the temperature of the reaction mixture is held at about 160° C. for about 30 minutes. Portion 4 is added and the reaction mixture is cooled to room temperature and filtered.

The resulting alkyd resin solution has a polymer solids content of about 55% by weight and the polymer has a Gardner Holdt viscosity at 25° C. of about W–Y.

The polymer is the product of

| | Parts by weight |
|---|---|
| Tung oil | 4.6 |
| Dehydrated castor oil fatty acids/pentaerythritol | 41.2 |
| Pentaerythritol benzoate | 10.0 |
| Pentaerythritol phthalate | 37.7 |
| Pentaerythritol | 6.5 |
| Total | 100.0 |

A paint composition is formed by using the same ingredients in the same proportions as in Example 1 except the above prepared acrylic-vinyl oxazoline ester solution is substituted for the ester solution used in Example 1 and similarly the above alkyd resin solution is substituted for the alkyd resin solution used in Example 1.

The above paint composition is blended with 2% by volume of the catalyst solution of Example 1 and a coating composition is then prepared by blending the following ingredients:

| | Parts by weight |
|---|---|
| Paint composition (prepared above) | 80 |
| Xylene | 40 |
| "Desmodur N" solution (32% solids of the biuret of hexamethylene diisocyanate in ethyl acetate) | 10 |
| Total | 130 |

The coating composition is applied as in Example 1 using the same primed, coated and uncoated steel substrates and air dried as in Example 1. In each case a tough, durable, weatherable finish results having excellent gloss and appearance and good adhesion to the substrate. The panels have an acceptable appearance after outdoor exposure to sunlight for extended periods.

EXAMPLE 6

An isocyanate solution is parpared by blending together the following ingredients:

| | Parts by weight |
|---|---|
| "Descodur N" Solution (described in Example 5) | 20.46 |
| Toluene | 76.14 |
| Dibutyl tin dilaurate | 2.44 |
| 2-ethylhexyl alcohol | 0.96 |
| Total | 100.00 |

A coating composition is then prepared by blending together the following ingredients:

| | Parts by volume |
|---|---|
| Paint composition (prepared in Example 5) | 8 |
| Isocyanate solution (prepared above) | 1 |
| Xylene | 4 |
| Total | 13 |

The coating composition is then sprayed onto a steel panel primed with about 1 mil of an alkyd resin primer pigmented with iron oxide and having a 0.5 mil thick coating of a black dip alkyl resin primer over the iron oxide primer. The coating is allowed to air dry. The resulting dried coating is about 2 mils thick, has good gloss and hardness, excellent smootheness, good image definition and has an excellent overall appearance. The coating also exhibits chip resistance and excellent weatherability.

I claim:
1. A coating composition comprising 5–60% by weight of a polymer blend and 95–40% by weight of a solvent for the polymer blend in which the blend consists essentially of
(1) 40–95% by weight of an acrylic vinyl oxazoline ester polymer that has a relative viscosity of about 1.03–1.30 measured according to ASTM-D-445-46-T, Method B at 25° C. and which consists essentially of a backbone of 50–96.5% by weight, based on the weight of the polymer, of polymerized ethylenically unsaturated monomers selected from the group consisting of an alkyl methacrylate having 1–8 carbon atoms in the alkyl group, cyclohexyl methacrylate, acrylonitrile, styrene and mixtures of these monomers and up to 20% by weight, based on the weight of the polymer, of a hydroxy containing monomer selected from the group consisting of hydroxy alkyl acrylate and hydroxy alkyl methacrylate having 2–4 in the alkyl groups and containing in the backbone 3–35% by weight, based on the weight of the polymer, of polymerized vinyl oxazoline esters of the formula

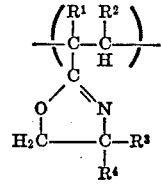

and having attached to the polymer backbone 0.5–15% by weight, based on the weight of the polymer, of pendent amino ester groups of the formula

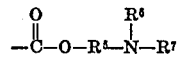

wherein
R¹ is a hydrocarbon group having 2–20 carbon atoms;
R² is selected from the group consisting of hydrogen and an alkyl group having 1–4 carbon atoms;
R³ and R⁴ are

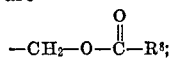

R⁵ is an aliphatic hydrocarbon group having 1–6 carbon atoms;
R⁶ and R⁷ are individually selected from the group consisting of hydrogen, a saturated aliphatic hydrocarbon group having 1–6 carbon atoms; and
R⁸ is from drying oil fatty acids, and correspondingly (2) 5–60% by weight of an alkyd resin or a blend of alkyd resins;
wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid;
and utilized with said coating composition about 0.5–200% by weight, based on the weight of the coating composition, of a polyisocyanate solution that consists essentially of 2–75% by weight of a polyisocyanate selected from the group consisting of polyisocyanate of the formula

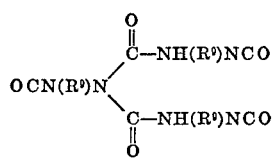

wherein R⁹ is a divalent aromatic hydrocarbon radical having 1–12 carbon atoms and methylene bis(4-cyclohexyl isocyanate) and an aromatic solvent for the polyisocyanate that is compatible with the coating composition.

2. The coating composition of claim 1 containing pigment in a pigment to binder ratio of about 1:100 to about 75:100.

3. The coating composition of claim 2 in which the polymer blend consists essentially of
50–75% by weight of said acrylic vinyl oxazoline ester polymer and 50–25% by weight of an alkyd resin and
wherein about 50–150% by weight of the polyisocyanate solution is used.

4. The coating composition of claim 3 in which the backbone of said vinyl oxazoline ester polymer is of an alkyl methacrylate in which the alkyl group has 1–8 carbon atoms, R¹ and R⁸ are from drying oil fatty acids, R² is hydrogen, R⁵ is a saturated aliphatic hydrocarbon group containing 2–4 carbon atoms, and R⁶ and R⁷ are individually selected from the group consisting of hydrogen and a saturated aliphatic hydrocarbon group containing 1–4 carbon atoms and in which the alkyd resin is the esterification product of a drying oil fatty acid, a polyhydric alcohol and an aromatic carboxylic acid or anhydride.

5. The coating composition of claim 4 in which the polyisocyanate solution consists essentially of
5–50% by weight of a polyisocyanate of the formula

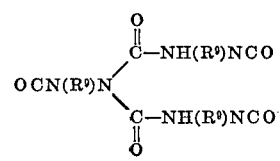

wherein R⁹ is a divalent aliphatic hydrocarbon radical having 1–12 carbon atoms;
0.1–5% by weight of an alkyl acid phosphate catalyst having 1–12 carbon atoms in the alkyl group, and
49.9–89.9% by weight of an aromatic hydrocarbon solvent.

6. The coating composition of claim 5 in which R⁹ is (CH₂)₆ and the alkyl group of the alkyl acid phosphate contains 2–6 carbon atoms.

7. The coating composition of claim 5 in which the backbone of said vinyl oxazoline polymer is of butyl methacrylate and methyl methacrylate, R¹ and R⁸ are from linseed oil fatty acids, R⁵ is an ethylene group, R⁶ is hydrogen, R⁷ is a tertiary butyl radical, the alkyd resin is the esterification product of linsed oil fatty acids, benzoic acid, pentaerythritol and phthalic anhydride.

8. The coating composition of claim 7 in which 5–50% by weight, based on the weight of the coating composition of a polyisocyanate solution is utilized that consists essentially of
10–25% by weight of a polyisocyanate of the formula

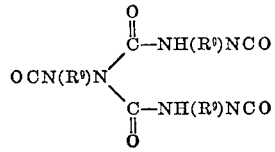

1–3% by weight of butyl acid phosphate, and
74–89% by weight of an aromatic hydrocarbon solvent.

9. The coating composition of claim 4 in which the polyisocyanate solution consists essentially of
5–50% by weight of methylene-bis-(4-cyclohexyl isocyanate);
0.1–5% by weight of an alkyl acid phosphate catalyst having 1–12 carbon atoms in the alkyl group;
49.9–89.9% by weight of an aromatic hydrocarbon solvent.

10. The coating composition of claim 9 in which the alkyl group of the alkyl acid phosphate contains 2–6 carbon atoms.

11. The coating composition of claim 7 in which 50–150% by weight, based on the weight of the coating composition, of a polyisocyanate solution is utilized that consists essentially of
10–25% by weight of methylene-bis-(4-cyclohexyl isocyanate),
1–3% by weight of butyl acid phosphate,
74–89% by weight of an aromatic hydrocarbon solvent.

12. The coating composition of claim 1 in which the backbone of said vinyl oxazoline ester polymer is of methyl methacrylate, butyl methacrylate, hydroxy ethyl acrylate, and diethyl aminoethyl methacrylate, R¹ and R⁸ are from linseed oil fatty acids, R² is hydrogen, R⁵ is an ethylene group, R⁶ and R⁷ are ethyl groups and the alkyd resin is the esterification product of tung oil, dehydrated castor oil fatty acids, benzoic acid, pentaerythritol and phthalic anhydride.

13. The coating composition of claim 12 in which the polyisocyanate solution consists essentially of
10–25% by weight of a polyisocyanate of the formula

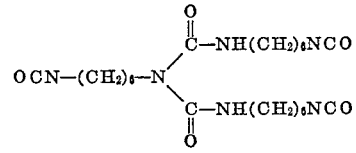

which is partially blocked with a monohydric alcohol having 8–12 carbon atoms;
1–3% by weight of alkyl tin dilaurate,
1–3% by weight of butyl acid phosphate, and
73–88% by weight of a hydrocarbon solvent.

14. The coating composition of claim 12 in which the polyisocyanate solution consists essentially of
2-75% by weight of a polyisocyanate of the formula

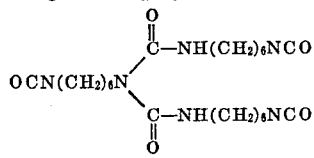

and correspondingly,
98-25% by weight of an aromatic hydrocarbon solvent.

References Cited
UNITED STATES PATENTS

| | | | |
|---|---|---|---|
| 2,981,712 | 4/1961 | Harper | 260—22 TN |
| 3,224,988 | 12/1965 | Skreckoski | 260—22 TN |
| 3,245,941 | 4/1966 | Mayer et al. | 260—31.6 |
| 3,248,397 | 4/1966 | Purcell | 260—33.6 UA |
| 3,457,324 | 7/1969 | Sekmakas | 260—834 |
| 3,585,160 | 6/1971 | Miller et al. | 260—22 CB |
| 3,597,373 | 8/1971 | Bregoff et al. | 260—17 R |
| 3,642,943 | 2/1972 | Noel | 260—859 R |
| 3,689,593 | 9/1972 | Jackson | 260—859 |
| 3,711,433 | 1/1973 | Willey | 260—17 R |

LUCILLE M. PHYNES, Primary Examiner

U.S. Cl. X.R.

117—75, 132 B, 138.8 R, 161 K & KP; 260—17 R, 22 CB, 23 P & TN, 33.6 UB, 873, 859